(12) United States Patent
Cloutier et al.

(10) Patent No.: US 12,498,495 B2
(45) Date of Patent: Dec. 16, 2025

(54) METHOD AND SYSTEM FOR DETERMINING A RADIATION DOSE FROM POLARIZED SIGNALS

(71) Applicant: Université Laval, Québec (CA)

(72) Inventors: Émily Cloutier, Québec (CA); Luc Beaulieu, Québec (CA); Louis Archambault, Québec (CA)

(73) Assignee: Université Laval, Quebec (CA)

( * ) Notice: Subject to any disclaimer, the term of this patent is extended or adjusted under 35 U.S.C. 154(b) by 66 days.

(21) Appl. No.: 18/558,677

(22) PCT Filed: May 3, 2022

(86) PCT No.: PCT/CA2022/050692
§ 371 (c)(1),
(2) Date: Nov. 2, 2023

(87) PCT Pub. No.: WO2022/232926
PCT Pub. Date: Nov. 10, 2022

(65) Prior Publication Data
US 2024/0230928 A1  Jul. 11, 2024

Related U.S. Application Data

(60) Provisional application No. 63/183,403, filed on May 3, 2021.

(51) Int. Cl.
*G01T 1/10* (2006.01)
*G01T 1/29* (2006.01)

(52) U.S. Cl.
CPC .............. *G01T 1/10* (2013.01); *G01T 1/2907* (2013.01)

(58) Field of Classification Search
CPC .... G01T 1/00; G01T 1/10; G01T 1/36; G01T 1/363; G01T 1/32; G01T 1/003; G01T 1/105; G01T 1/102; G01T 1/20; G01T 1/22
See application file for complete search history.

(56) References Cited

U.S. PATENT DOCUMENTS

2016/0332000 A1\* 11/2016 Hale ..................... G01T 1/29

\* cited by examiner

*Primary Examiner* — Don K Wong
(74) *Attorney, Agent, or Firm* — SMART & BIGGAR LP; David Morrison; Jason B. Hynes

(57) ABSTRACT

A method and system for determining a radiation dose is provided. The method can include receiving at least one polarized signal from a radio-luminescent element and determining a degree of linear polarization and an angle of linear polarization of the at least one polarized signal based on at least one predetermined polarization transmission axis. The system can include a polarization sensitive sensor for capturing at least one polarized signal from a radio-luminescent element; and a processor. The processor can be configured to: receive the at least one polarized signal; and determine a degree of linear polarization and an angle of linear polarization of the at least one polarized signal based on at least one predetermined polarization transmission axis.

20 Claims, 3 Drawing Sheets

METHOD AND SYSTEM FOR DETERMINING A RADIATION DOSE FROM POLARIZED SIGNALS

RELATED APPLICATIONS

This application is a 371 of international Application No. PCT/CA2022/050692, filed on May 3, 2022, which claims the benefit of U.S. Provisional Patent Application Ser. No. 63/183,403, filed on May 3, 2021, entitled, "METHOD AND SYSTEM FOR DETERMINING A RADIATION DOSE FROM POLARIZED SIGNALS", the entire content of which are hereby incorporated by reference herein for all purposes.

FIELD OF THE DISCLOSURE

The present disclosure relates to a method and system for determining a radiation dose from polarized signals.

BACKGROUND OF THE DISCLOSURE

Polarization imaging have proven benefits over conventional imaging in detecting stress, surface roughness and reducing glare. Given the intrinsic polarization of Cerenkov and scintillation signals, polarization imaging underlies potential benefits for dose measurements in radiotherapy that have not yet been exploited.

SUMMARY OF THE DISCLOSURE

According to one aspect, there is disclosed a method for determining a radiation dose, including: receiving at least one polarized signal from a radio-luminescent element; and determining a degree of linear polarization and an angle of linear polarization of the at least one polarized signal based on at least one predetermined polarization transmission axis.

For example, the method further includes determining the radiation dose based on the degree of linear polarization and the angle of linear polarization of the at least one polarized signal and a predefined correction factor.

For example, the method further includes capturing the at least one polarized signal with a polarization sensitive sensor.

For example, the radio-luminescent element is inherently polarized.

For example, the radio-luminescent element comprises Cerenkov radiation.

For example, the method further includes determining a directionality of the Cerenkov radiation based at least on the degree of linear polarization and the angle of linear polarization of the Cerenkov radiation.

For example, the method further includes correcting the directionality of the Cerenkov radiation based on the polarized acquired signal and the predefined correction factor describing directionality of Cerenkov light.

For example, the degree of linear polarization and angle of linear polarization of the radio-luminescent element are spatially determined.

For example, the radio-luminescent element is a scintillation element.

For example, the angle of polarization of a radio-luminescent element is determined by a polarizing element.

For example, the polarization sensitive sensor captures the at least one polarized signal using two sets of orthogonal polarization transmission axis.

For example, the polarization sensitive sensor captures the at least one polarized signal using a plurality of polarization transmission axis that are not colinear.

For example, the polarization sensitive sensor captures the at least one polarized signal using a plurality of polarization transmission axis that are not orthogonal.

For example, the two sets of orthogonal polarization transmission axis angles comprise a first set of [0°, 90°] angles and a second set of [45°, 135°] angles.

For example, the degree of linear polarization and the angle of linear polarization of the at least one signal are determined based on:

$$DoLP = I_{pol}/(I_{pol} + I_{rand.pol.})$$

$$AoLP = \alpha$$

wherein:
DoLP refers to the degree of linear polarization;
AoLP is the angle of linear polarization;
$I_{pol}$ refers a polarized contribution of the signal;
$I_{rand.pol.}$ refers to a randomly polarized portion of the signal; and
$\alpha$ refers to a mean angle of polarization.

For example, the degree of linear polarization and the angle of linear polarization of the at least one polarized signal are determined using:

$$I = I_{pol} \cos^2(\alpha_0 - \alpha) + \cdot I_{rand.pol.}$$

wherein:
I refers to the total signal acquired from one transmission axis;
$I_{pol}$ refers to the polarized portion of the signal;
$I_{rand.pol.}$ refers to the randomly polarized portion of the signal;
$\alpha_0$ refers to the transmission axis;
$\alpha$ refers to the angle of linear polarization;
$(I_{pol})/(I_{pol}+I_{rand.pol.})$ refers to the degree of linear polarization.

For example, the degree of linear polarization and the angle of linear polarization of the at least one signal are determined using Stokes parameters:

$$\vec{S} = \begin{pmatrix} S_0 \\ S_1 \\ S_2 \\ S_3 \end{pmatrix} = \begin{pmatrix} I_0 + I_{90} \\ I_0 - I_{90} \\ I_{45} - I_{135} \\ 1 - (S_1^2 + S_2^2) \end{pmatrix}$$

$$AoLP = \arctan(S_2/S_1)$$

$$DoLP = \sqrt{S_1^2 + S_2^2}/S_0$$

wherein:
DoLP is the degree of linear polarization;
AoLP is the angle of linear polarization;
$I_0$ refers to signal acquired from a polarization transmission angle of 0°;
$I_{45}$ refers to signal acquired from a polarization transmission angle of 45°;
$I_{90}$ refers to signal acquired from a polarization transmission angle of 90°; and $I_{135}$ refers to signal acquired from a polarization transmission angle of 145°.

For example, the polarization sensitive sensor is a photodetector.

For example, the polarization sensitive sensor is an array of photodetectors.

For example, the polarization sensitive sensor is a camera.

For example, the polarization sensitive sensor comprises a photodetector combined with a polarizer.

For example, the polarizer is rotated to provide measurements from different transmission axes.

For example, the correction factor is determined based on Monte Carlo simulations.

For example, the correction factor is determined based on measurements.

For example, the method is repeated at multiple locations in space and renders a dose distribution.

According to one aspect, there is disclosed a system for determining a radiation dose, including: a polarization sensitive sensor for capturing at least one polarized signal from a radio-luminescent element; and a processor configured to: receive the at least one polarized signal; and determine a degree of linear polarization and an angle of linear polarization of the at least one polarized signal based on at least one predetermined polarization transmission axis.

For example, the processor is further configured to determine the radiation dose based on the degree of linear polarization and the angle of linear polarization of the at least one signal and a predefined correction factor.

For example, the radio-luminescent element comprises Cerenkov radiation.

For example, the processor is further configured to determine a directionality of the Cerenkov radiation based at least on the degree of linear polarization and the angle of linear polarization of the Cerenkov radiation.

For example, the processor is further configured to determine a directionality of the Cerenkov radiation based at least on the degree of linear polarization and the angle of linear polarization of the Cerenkov radiation.

For example, the degree of linear polarization of the radio-luminescent element is spatially determined.

For example, the radio-luminescent element is a scintillation element.

For example, the angle of polarization of a radio-luminescent element is determined by a polarizing element.

For example, the polarization sensitive sensor captures the at least one polarized signal using two sets of orthogonal polarization transmission axis angles.

For example, the polarization sensitive sensor captures the at least one polarized signal using a plurality of polarization transmission axis that are not colinear.

For example, the polarization sensitive sensor captures the at least one polarized signal using a plurality of polarization transmission axis that are not orthogonal.

For example, the two sets of orthogonal polarization transmission axis angles comprise a first set of [0°, 90°] angles and a second set of [45°, 135°] angles.

For example, the degree of linear polarization and the angle of linear polarization of the at least one polarized signal are determined using:

$$I = I_{pol} \cos^2(\alpha_0 - \alpha) + \cdot I_{rand.pol.}$$

wherein:
I refers to the total signal acquired from one transmission axis;
$I_{pol}$ refers to the polarized portion of the signal;
$I_{rand.pol.}$ refers to the randomly polarized portion of the signal;
$\alpha_0$ refers to the transmission axis;
$\alpha$ refers to the angle of linear polarization; and
$(I_{pol})/(I_{pol}+I_{rand.pol.})$ refers to the degree of linear polarization.

For example, the degree of linear polarization and the angle of linear polarization of the at least one signal are determined based on:

$$DoLP = I_{pol}/(I_{pol} + I_{rand.pol.})$$

$$AoLP = \alpha$$

wherein:
DoLP refers to the degree of linear polarization;
AoLP is the angle of linear polarization;
$I_{pol}$ refers a polarized contribution of the signal;
$I_{rand.pol.}$ refers to a randomly polarized portion of the signal; and
$\alpha$ refers to a mean angle of polarization.

For example, the degree of linear polarization and the angle of linear polarization of the at least one signal are determined using Stokes parameters such that:

$$\vec{S} = \begin{pmatrix} S_0 \\ S_1 \\ S_2 \\ S_3 \end{pmatrix} = \begin{pmatrix} I_0 + I_{90} \\ I_0 - I_{90} \\ I_{45} - I_{135} \\ 1 - (S_1^2 + S_2^2) \end{pmatrix}$$

$$AoLP = \arctan(S_2/S_1)$$

$$DoLP = \sqrt{S_1^2 + S_2^2}/S_0$$

wherein:
DoLP is the degree of linear polarization;
AoLP is the angle of linear polarization;
$I_0$ refers to signal acquired from a polarization transmission angle of 0°;
$I_{45}$ refers to signal acquired from a polarization transmission angle of 45°;
$I_{90}$ refers to signal acquired from a polarization transmission angle of 90°; and
$I_{135}$ refers to signal acquired from a polarization transmission angle of 145°.

For example, the polarization sensitive sensor is photodetector.

For example, the polarization sensitive sensor is a camera.

For example, the polarization sensitive sensor comprises a photodetector combined with a polarizer.

For example, the polarizer is rotated to provide measurements from different transmission axes.

For example, the correction factor is determined based on Monte Carlo simulations.

For example, the correction factor is determined based on measurements.

DETAILED DESCRIPTION OF THE DISCLOSURE

Figure 1:
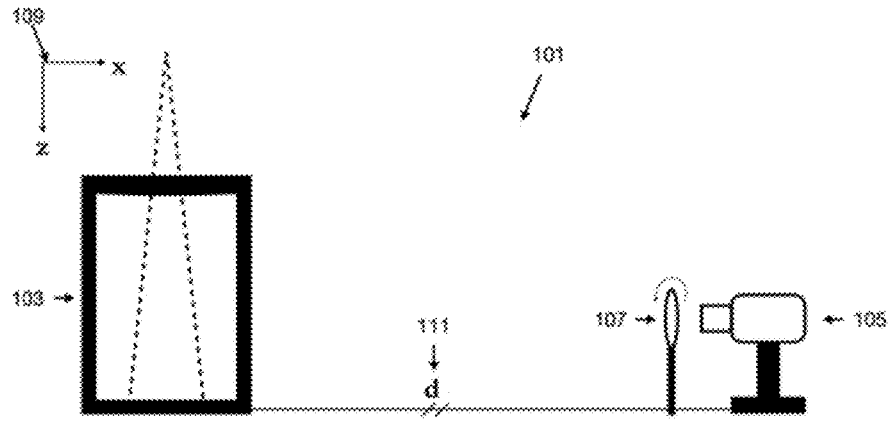
FIG. 1 shows a system for determining a radiation dose according to one example.

Cerenkov light is an emission of optical photons due to high energy charged particles traveling in a medium at speeds greater than the local speed of light. The threshold energy of the charged particle typically necessary to generate Cerenkov light emission will vary according to the refractive index of the material.

In the context of radiotherapy, the ionizing radiation used to treat cancerous tumors provides direct or indirect electrons with sufficient energy to generate Cerenkov light emission in many translucent media exposed to radiation.

Polarization is one of light's key property, together with color and intensity. The polarization state refers to the direction of oscillation of a wave. Light can be polarized, partially polarized or non-polarized, also referred to randomly polarized. From its production mechanism, Cerenkov light is expected to be linearly polarized. Its polarization angle is related to its direction of propagation.

According to one aspect of the disclosure, using polarization imaging, Cerenkov dose measurements can be achieved with deviations from reference dose calculations within, for e.g., 5% in electronic equilibrium regions. These results demonstrate the benefits of polarization imaging for dose measurements which opens up possibilities for more accurate perturbation-free in-water, real-time and high-resolution dose measurements.

Polarization imaging have proven benefits over conventional imaging in detecting stress, surface roughness and reducing glare. Given the intrinsic polarization of Cerenkov and scintillation signals, polarization imaging underlies potential benefits for dose measurements in radiotherapy that have not yet been exploited (see Yamamoto S et al. Med Phys. 2021:48(1):427-433). Cerenkov radiation has been demonstrated to be a useful tool for monitoring beam shapes, in particular for breast cancer radiotherapy (see Hachadorian R L et al. Nat Commun. 2020:11(1) :2298). However, its directionality limits its range of applications regarding precise dose measurements (see Pogue B W et al. J Phys Conf Ser. 2015; 573(1):012013; see also Glaser A K et al. Med Phys. 2013; 40(1)) and a secondary scintillator such as quinine is often added to the water to bypass this problem (See Jean E et al 2019 Phys. Med. Biol. 64 155019). Indeed, the Cerenkov to dose proportionality varies according to the source-phantom-detector geometry. This is the reason Cerenkov is often referred to as a spurious signal that needs to be removed.

Despite the challenges demonstrated, Cerenkov-based dosimetry still carries the potential of perturbation-free in-water, real-time and high-resolution dose measurements (see Zlateva Y et al. Med Phys. 2019; 40(1); see also Zlateva Y et al. Med Phys. 2019; 46(5)). As Cerenkov polarization vector is related to the Cerenkov emission cone and thus direction, Cerenkov polarization can be characterized in the context of photon beam dose measurements. Specifically, the degree of polarization and angle of polarization can be acquired. Polarization is further investigated as a novel method to understand and correct Cerenkov emission anisotropy. Taking advantage of a set of measurements performed at different polarization angle, the polarized Cerenkov can be extracted from the signal while measuring its polarization angle.

According to the present disclosure, a method for determining a radiation dose, can include: receiving at least one polarized signal from a radio-luminescent element; and determining a degree of linear polarization and an angle of linear polarization of the at least one polarized signal based at least on a predetermined polarization transmission axis.

The method can include determining the radiation dose based on the degree of linear polarization and the angle of linear polarization of the at least one polarized signal and a predefined correction factor. The method can further include capturing the at least one signal with a polarization sensitive sensor.

The radio-luminescent element can be inherently polarized. The radio-luminescent element can include Cerenkov radiation.

The method can further include: determining a directionality of the Cerenkov radiation based at least on the degree of linear polarization and the angle of linear polarization of the Cerenkov radiation; and correcting the directionality of the Cerenkov radiation based on the polarized acquired signal and the predefined correction factor describing directionality of Cerenkov light.

The degree of linear polarization and angle of linear polarization of the radio-luminescent element are spatially determined. The radio-luminescent element can be a scintillation element.

The angle of polarization of a radio-luminescent element is determined by a polarizing element. The polarization sensitive sensor can capture the at least one polarized signal using two sets of orthogonal polarization transmission axis angles. The polarization sensitive sensor can capture the at least one polarized signal using a plurality of polarization transmission axis that are not colinear. The polarization sensitive sensor can capture the at least one polarized signal using a plurality of polarization transmission axis that are not orthogonal.

The two sets of orthogonal polarization transmission axis angles can include, for example, a first set of [0°, 90°] angles and a second set of [45°, 135°] angles.

The degree of linear polarization and the angle of linear polarization of the at least one signal can be determined based on Malus law:

$$DoLP = I_{pol}/(I_{pol} + I_{rand.pol.})$$

$$AoLP = \alpha$$

wherein:
DoLP refers to the degree of linear polarization;
AoLP is the angle of linear polarization;
$I_{pol}$ refers a polarized contribution of the signal;

$I_{rand.pol.}$ refers to a randomly polarized portion of the signal; and

α refers to a mean angle of polarization.

The degree of linear polarization and the angle of linear polarization of the at least one polarized signal can be determined using:

$$I = I_{pol} \cos^2(\alpha_0 - \alpha) + \cdot I_{rand.pol.}$$

wherein:

I refers to the total signal acquired from one transmission axis;

$I_{pol}$ refers to the polarized portion of the signal;

$I_{rand.pol.}$ refers to the randomly polarized portion of the signal;

$\alpha_0$ refers to the transmission axis;

α refers to the angle of linear polarization;

$(I_{pol})/(I_{pol}+I_{rand.pol.})$ refers to the degree of linear polarization.

The degree of linear polarization and the angle of linear polarization of the at least one signal can also be determined using Stokes parameters such that:

$$\vec{S} = \begin{pmatrix} S_0 \\ S_1 \\ S_2 \\ S_3 \end{pmatrix} = \begin{pmatrix} I_0 + I_{90} \\ I_0 - I_{90} \\ I_{45} - I_{135} \\ 1 - (S_1^2 + S_2^2) \end{pmatrix}$$

$$AoLP = \arctan(S_2/S_1)$$

$$DoLP = \sqrt{S_1^2 + S_2^2}/S_0$$

wherein:

DoLP is the degree of linear polarization;

AoLP is the angle of linear polarization;

$I_0$ refers to signal acquired from a polarization transmission angle of 0°;

$I_{45}$ refers to signal acquired from a polarization transmission angle of 45°;

$I_{90}$ refers to signal acquired from a polarization transmission angle of 90°; and $I_{135}$ refers to signal acquired from a polarization transmission angle of 145°.

The polarization sensitive sensor can be a photodetector. The polarization sensitive sensor can be an array of photodetectors. The polarization sensitive sensor can also be a camera. The polarization sensitive sensor can include a photodetector combined with a polarizer.

The polarizer can be rotated to provide measurements from different transmission axes. The correction factor can be determined based on Monte Carlo simulations. The correction factor can be determined based on measurements. The above method can be repeated at multiple locations in space and render a dose distribution.

A system for determining a radiation dose can include: a polarization sensitive sensor for capturing at least one polarized signal from a radio-luminescent element; and a processor. The processor can be configured to: receive the at least one polarized signal; and determine a degree of linear polarization and an angle of linear polarization of the at least one polarized signal based on at least one predetermined polarization transmission axis.

The processor can further be configured to determine the radiation dose based on the degree of linear polarization and the angle of linear polarization of the at least one signal and a predefined correction factor.

The processor can further be configured to determine a directionality of the Cerenkov radiation based at least on the degree of linear polarization and the angle of linear polarization of the Cerenkov radiation.

The processor can be configured to determine a directionality of the Cerenkov radiation based at least on the degree of linear polarization and the angle of linear polarization of the Cerenkov radiation.

The degree of linear polarization of the radio-luminescent element can be spatially determined. The radio-luminescent element can be or include a scintillation element.

The angle of polarization of a radio-luminescent element can be determined by a polarizing element. The polarization sensitive sensor can capture the at least one polarized signal using two sets of orthogonal polarization transmission axis angles. The polarization sensitive sensor can capture the at least one polarized signal using a plurality of polarization transmission axis that are not colinear. The polarization sensitive sensor can capture the at least one polarized signal using a plurality of polarization transmission axis that are not orthogonal. The two sets of orthogonal polarization transmission axis angles can include a first set of [0°, 90°] angles and a second set of [45°, 135°] angles.

The degree of linear polarization and the angle of linear polarization of the at least one polarized signal can be determined using:

$$I = I_{pol}\cos^2(\alpha_0 - \alpha) + \cdot I_{rand.pol.}$$

wherein:

I refers to the total signal acquired from one transmission axis;

$I_{pol}$ refers to the polarized portion of the signal;

$I_{rand.pol.}$ refers to the randomly polarized portion of the signal;

$\alpha_0$ refers to the transmission axis;

α refers to the angle of linear polarization; and $(I_{pol})(I_{pol}+I_{rand.pol.})$ refers to the degree of linear polarization.

The degree of linear polarization and the angle of linear polarization of the at least one signal can be determined based on Malus law:

$$DoLP = I_{pol}/(I_{pol} + I_{rand.pol.})$$

$$AoLP = \alpha$$

wherein:

DoLP refers to the degree of linear polarization;

AoLP is the angle of linear polarization;

$I_{pol}$ refers a polarized contribution of the signal;

$I_{rand.pol.}$ refers to a randomly polarized portion of the signal; and

α refers to a mean angle of polarization.

The degree of linear polarization and the angle of linear polarization of the at least one signal can also be determined using Stokes parameters such that:

$$\vec{S} = \begin{pmatrix} S_0 \\ S_1 \\ S_2 \\ S_3 \end{pmatrix} = \begin{pmatrix} I_0 + I_{90} \\ I_0 - I_{90} \\ I_{45} - I_{135} \\ 1 - (S_1^2 + S_2^2) \end{pmatrix}$$

-continued $$AoLP = \arctan(S_2/S_1)$$

$$DoLP = \sqrt{S_1^2 + S_2^2}/S_0$$

wherein:
DoLP is the degree of linear polarization;
AoLP is the angle of linear polarization;
$I_0$ refers to signal acquired from a polarization transmission angle of 0°;
$I_{45}$ refers to signal acquired from a polarization transmission angle of 45°;
$I_{90}$ refers to signal acquired from a polarization transmission angle of 90°; and
$I_{135}$ refers to signal acquired from a polarization transmission angle of 145°.

The polarization sensitive sensor can be a photodetector. The polarization sensitive sensor can also be a camera. The polarization sensitive sensor can include a photodetector combined with a polarizer. The polarizer can be rotated to provide measurements from different transmission axes.

The correction factor can be determined based on Monte Carlo simulations. The correction factor can also be determined based on measurements.

According to the present disclosure, a method for determining a radiation dose is provided. The method can includes receiving at least one image of a Cerenkov-generating-medium and determining at least one Cerenkov polarization signal based on the at least one image and a polarizer transmission axis of a polarizer. The method can further include determining, for each pixel of the at least one image, an intensity of the at least one Cerenkov polarization signal The method can further include determining the radiation dose based on the intensity of the at least one Cerenkov polarization signal and a predefined correction factor.

The Cerenkov-generating-medium can be a water tank. The image can include a polarized image and/or a non-polarized image. The image can be a 2D or 3D image.

The method can further include rotating the polarizer to determine a Cerenkov polarization signal from the image at various polarizer transmission axes. For example, the polarizer transmission axis can be 0°, 45°, 90° and 135°.

For example, the step of determining the intensity of the Cerenkov polarization signal can include determining the intensity of the Cerenkov polarization signal transmitted through the polarizer with a transmission angle of $\alpha_0$ by calculating:

$$I = I_{pol}\cos^2(\alpha_0 - \alpha) + \cdot I_{rand.pol.}$$

wherein: I refers to the intensity; $I_{pol}$ refers a polarized contribution of the signal; α refers to a mean angle of polarization; and $I_{rand.pol.}$ refers to a randomly polarized portion of the signal.

According to the present disclosure, there is also disclosed a system for determining a radiation dose. The system can include a Cerenkov-generating medium; a capture device for generating at least one image of the Cerenkov-generating-medium; a polarizer positionable between the Cerenkov-generating medium and the capture device; and a processor.

The processor can be configured to: receive at least one image of a Cerenkov-generating-medium; determine at least one Cerenkov polarization signal based on at least one image and a polarizer transmission axis of the polarizer; determine, for each pixel of an image, an intensity of the Cerenkov polarization signal; and determine the radiation dose based on the intensity of the Cerenkov polarization signal and a predefined correction factor.

The capture device can be a camera, such as a CCD camera.

For example, the processor can also be configured to determine at least one Cerenkov polarization signal based on a polarizer transmission axis of 0°, 45°, 90° and 135°.

The processor can also be configured to determine the intensity of the Cerenkov polarization signal transmitted through the polarizer with a transmission angle of $\alpha_0$ by calculating:

$$I = I_{pol}\cos^2(\alpha_0 - \alpha) + \cdot I_{rand.pol.}$$

wherein: I refers to the intensity; $I_{pol}$ refers a polarized contribution of the signal; α refers to a mean angle of polarization; and $I_{rand.pol.}$ refers to a randomly polarized portion of the signal.

Example #1

Polarization Imaging for High Precision Water-Based Cerenkov Dose Measurements.

According to one embodiment, Cerenkov polarization can be measured using a linearly polarized filter (XP42-18; Edmund Optics, Barrington, NJ) that can be rotated. Measurements are repeated with the polarizer transmission axis at 0°, 45°, 90° and 135°, successively. Using Malus's law, together with the assumptions that signals are partly polarized, the intensity transmitted through a polarizer with a transmission angle of α0 is given by:

$$I = I_{pol}\cos^2(\alpha_0 - \alpha) + \cdot I_{rand.pol.}$$

For each pixel, we fitted this relation to extract $I_{pol}$, α and $I_{rand.pol.}$, which respectively refer to the polarized contribution of the signal, the mean angle of polarization and the randomly polarized portion of the signal.

FIG. 1 shows a system 101 representing an experimental setup comprising a 15×15×20 cm³ water tank 103 imaged by a CCD camera 105 from different polarization orientations (for e.g., 0°, 45°, 90° and 135°) of a polarizer 107. The coordinate system 109 is presented in the top left corner.

Using the system 101, Cerenkov produced in a 15×15×20 cm³ water tank 103 was imaged, with 6 MV and 23 MV photon beams. The water tank surface was aligned at the isocenter of a 5×5 cm² field. A cooled CCD camera 105 (for e.g., Atik 414EX; Atik Cameras, Norwich, United Kingdom) captured the resulting Cerenkov signal at a distance 111 of 50 cm, with a rotating polarizer 107 aligned in front (see FIG. 1). The resulting 2D images correspond to the sum of Cerenkov produced over the optical axis (or tank thickness).

Hence, Cerenkov light from different polarization angles is summed, resulting in an overall partly polarized signal despite the polarized nature of Cerenkov. Measurements without a polarizer in front of the camera are also acquired to compare polarized data with raw Cerenkov measurements. For each set of measurement, percent depth dose (PDD) and profiles at depth of maximum dose ($d_{max}$) are extracted. Measurements are compared with dose calculations performed on a treatment planning system (Pinnacle 9.2, Philips Healthcare, Andover, MA), using CT images of the phantom.

Cerenkov signal corrections are further investigated by taking advantage of the polarized signal and its directionality. In fact, Cerenkov is known to be directional, with its angle of emission determined by the charge particle momentum:

$$\cos(\theta) = c \cdot [vn]^{-1}.$$

The anisotropic Cerenkov signal, i.e. polarized component, may be proportional to the dose, given a correction function taking into account the anticipated directionality of Cerenkov:

$$D(x, y) \propto C_\theta(x, y) \cdot C_\phi(x, y) \cdot I_{pol}(x, y)$$

where $C_\theta(x, y)$ and $C_\phi(x, y)$ refer to the polar and azimuthal angular Cerenkov dependencies correction. Monte Carlo simulation can be carried using Geant4 toolkit (v4.10.04) and the 6 MV IAEA 4×4 cm² Clinac Phase Space to extract the angular distribution of Cerenkov. The radiation beam can irradiate a water tank in which the direction of Cerenkov photons produced are scored in the volume. The mean polar and azimuthal distribution in the electronic equilibrium region are extracted and applied to correct the polarized signal for PDD and profiles measurements. The polar and azimuthal coordinate system is shown on FIG. 3.

Figure 2:
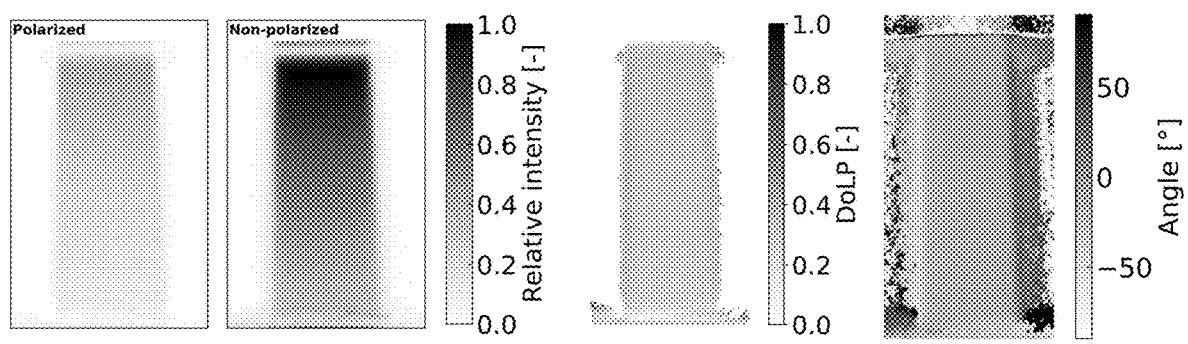
FIG. 2 shows polarized, non-polarized and angle of polarization of images according to one example.

From Malus's law regression, $I_{pol}$, $\alpha$ and $I_{rand.pol.}$ can be extracted resulting in images of the polarized signal, randomly polarized signal and angle of polarization. Overall, the fit can be achieved with a regression coefficient $r^2 > 0.98$. FIG. 2 shows the resulting images at 6 MV. In FIG. 2, intensity is normalized to non-polarized signal at $d_{max}$. Taking the ratio of the polarized signal over the total signal in the regions of electronic equilibrium, a degree of linear polarization of 29±1% is obtained.

The angular image depicts an asymmetrical angular variation towards the edges of the radiation beam. In this region, the degree of linear polarization increases following the loss of electronic equilibrium. The image is further asymmetric as the azimuthal electron distribution is oriented in the out-of-field direction.

Figure 3:
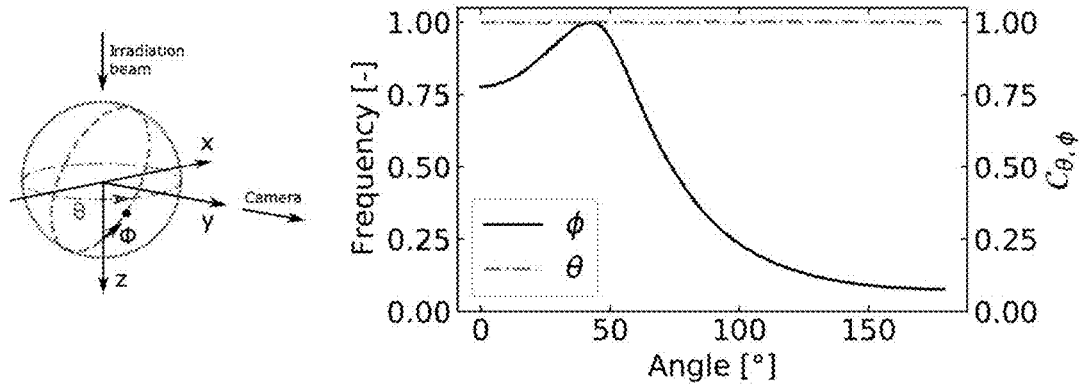
FIG. 3 shows a polar and azimuthal Cerenkov distribution and correction factor according to one example.

FIG. 3 presents the polar and azimuthal Cerenkov angular distribution acquired from Monte Carlo calculations. The polar and azimuthal Cerenkov distribution is produced in water by a 6 MV photon beam. The distributions are acquired in region of electronic equilibrium. These also corresponds to the dose correction function $C_\theta(x, y)$ and $C_\phi(x, y)$ applied to account for Cerenkov directionality. The $\theta$ distribution is constant unlike $\varphi$ distribution which presents a maximum emission towards 41°, as expected. The angle relates to the angle from which a measurement is made. Here, since the camera is located 50 cm from the beam, $\varphi$ ranges approximately from 80 to 100° and $\theta$ from 85 to 95°.

Figure 4:
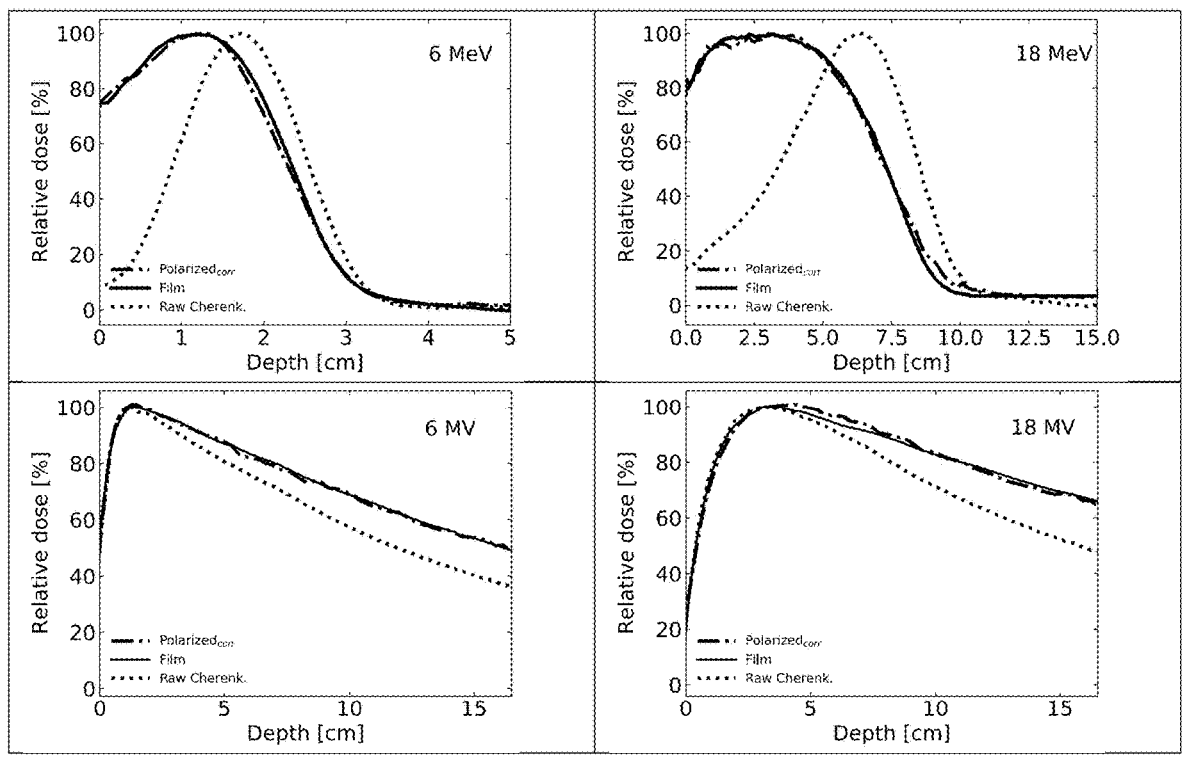
FIG. 4 shows photon beams and electron beams percent depth dose summed over the thickness of a water tank and compared to reference dosimetric film measurements according to one example.

FIG. 4 presents the percent depth dose obtained for several conditions at 6 MV and 23 MV. The figure presents the curves obtained from the polarized and randomly polarized components of the Cerenkov signal. These are compared with the raw Cerenkov response as well as a reference dose calculation performed on the treatment system. In addition, the corrected polarized signal is presented. Cerenkov corrected signal present deviations (mean±standard deviation) of 0.8±1% and 1±3% from TPS calculations at 6 MV and 23 MV respectively. For comparison, the raw Cerenkov signal presented deviations up to 20%.

In FIG. 4, the percent depth dose is summed over the thickness of the tank and compared to the prediction from the treatment planning system (TPS). Raw Cerenkov refers to the signal obtained without polarizer in front of the camera. The vertical dotted line indicates the position of maximum after which electronic equilibrium is reached. Horizontal red dotted lines indicate the ±4% difference region.

5 presents profiles are drawn at the depth of maximum dose, i.e., 1.2 cm at 6 MV and 3.05 cm at 23 MV. The corrected signal and TPS calculations present greater discrepancies in the penumbra region where electronic equilibrium is lost. As a result, a higher proportion of the signal is polarized, resulting in shoulders. At 6 MV, discrepancies between the corrected polarized signal and the TPS calculation are of 1±3% and 8±3 on the central axis and penumbra regions respectively. At 23 MV, 2±3% and 6±2% are obtained for the central axis and penumbra regions. Regarding the field sizes, the corrected signal results in a field size of 5.00±0.03 cm which compares to the 5.1±0.1 predicted from the TPS at 6 MV. 5.22±0.03 cm and 5.0±0.1 are respectively obtained for 23 MV measurements.

For profile measurements, better agreement is found using the randomly polarized signal. This opens up the possibility of developing a model that would use a combination of the corrected polarized signal and the randomly polarized signal.

Figure 5:
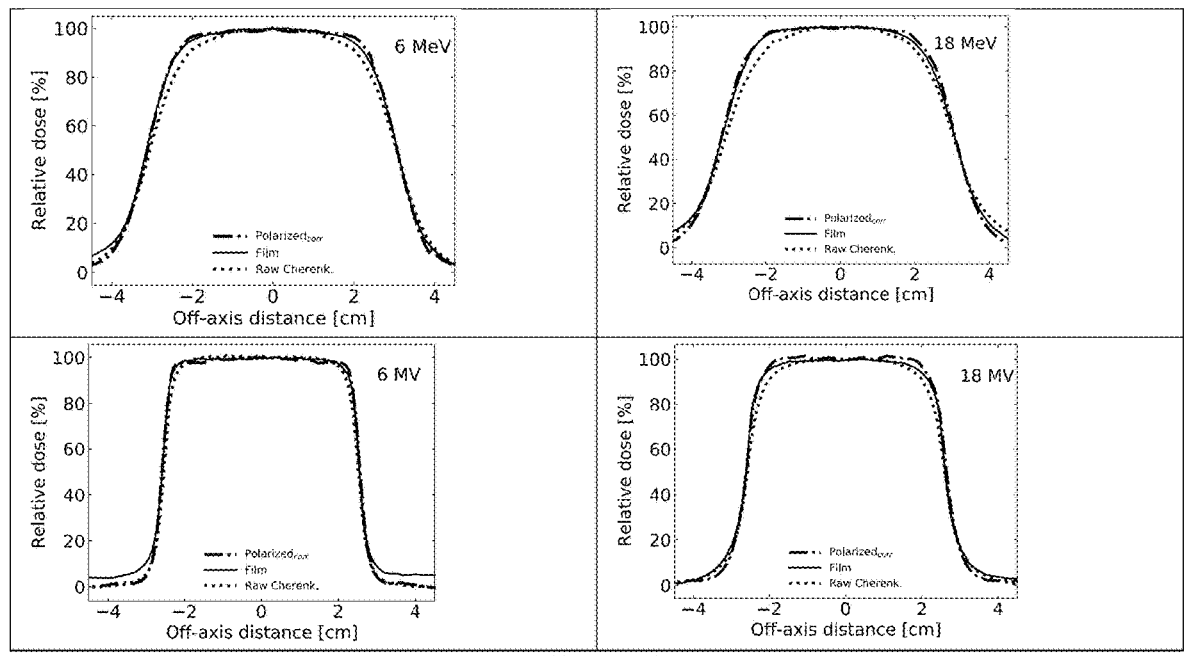
FIG. 5 shows photon beams and electron beams profiles extracted at depth of maximum dose summed over a thickness of a tank and compared to reference dosimetric film measurements according to one example.

Regarding FIG. 5, profiles are extracted at $d_{max}$ summed over the thickness of the tank and compared to the prediction from the treatment planning system (TPS). Raw Cerenkov refers to the signal obtained without polarizer in front of the camera. The vertical dotted line indicates the central axis region (80% dose). Horizontal red dotted lines indicate the ±4% difference region.

As explained above, a method for measuring Cerenkov polarization was developed. Using a set of 4 measurements performed from 4 polarization transmission axis the polarized and randomly polarized contributions of the Cerenkov signal, were measured, as well as the mean angle of linear polarization. Taking advantage of the know Cerenkov directionality, it is proposed a correction technique that enabled agreement within 4% on the depth dose which otherwise presented deviations up to 20%. As for the profile measurements, agreement is reduced in the beam penumbra region, but remained acceptable on the central axis, i.e., within 3% and 5% at 6 MV and 23 MV. This shows the proven benefits of polarization imaging for dose measurements.

Referring to FIG. 4, there is shown a comparison of Cherenkov percent depth dose obtained and corrected with polarized element together with raw Cherenkov measurements compared to reference film measurements. Raw Cerenkov refers to the signal obtained without polarizer in front of the camera. As shown in FIG. 4, the method is investigated for photon beams (6 MV and 18 MV) and electron beam measurements (6 MeV and 18 MeV).

Referring to FIG. 5, there is shown a comparison of Cherenkov dose profiles obtained at depth of maximum dose and corrected with polarized element together with raw Cherenkov measurements compared to reference film measurements. Raw Cerenkov refers to the signal obtained without polarizer in front of the camera. As shown in FIG.

5, the method is investigated for photon beams (6 MV and 18 MV) and electron beam measurements (6 MeV and 18 MeV).

Figure 6:
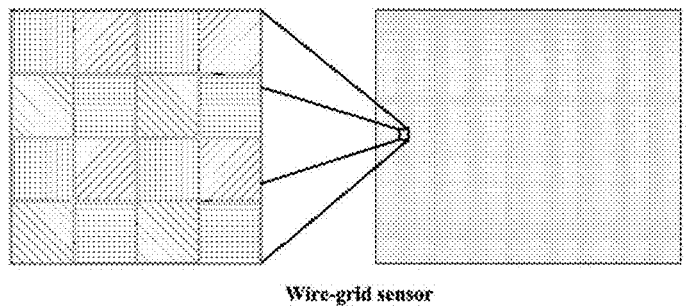
FIG. 6 shows a sensor on which polarizers from four polarization axis are embedded according to one example.

Referring to FIG. 6, there is shown a wire-grid sensor that can be implemented on a camera chip. Advantageously, the use of such wire-grid sensor (i.e., a photo-detection system) enables the simultaneous signal acquisition from four transmission axis. The wire grid provides measurements along 0°, 45°, 90° and 135° transmission axis. These transmission axes are embedded on individual pixels forming a mosaic.

Figure 7:
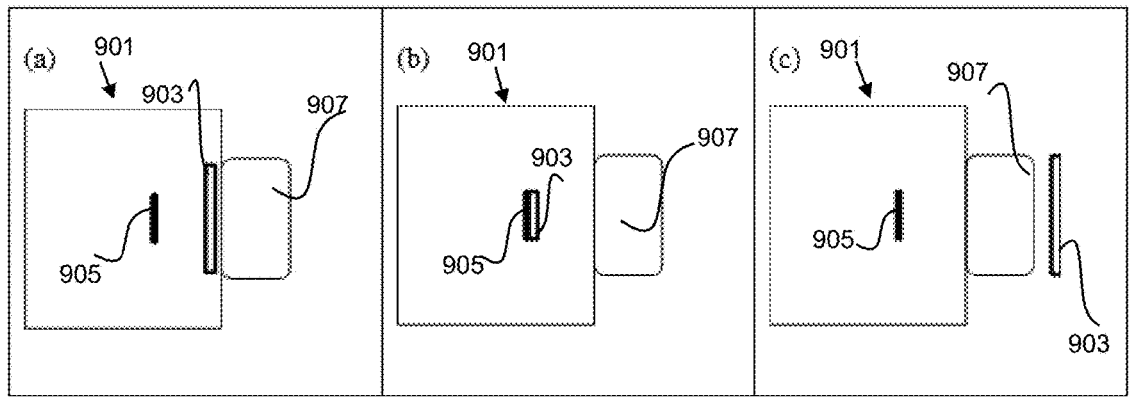
FIG. 7 shows different photo detection setups according to some examples.

Referring to FIG. 7, there is shown different photo detection setup 901 wherein: in (a), a polarizer 903 is inserted between the sensor 905 and camera lens 907; in (b), polarizers 903 are embedded on the sensor 905; and in (c), a polarizer 903 is set before the camera lens 907. For (a) and (c) the different transmission axis images could be obtained by rotating the polarizer or using a combination of camera with polarizer fixed in different transmission axis. With respect to (b), it comes at the disadvantage of a reduced spatial sampling of each transmission axis but has the advantage of a simultaneous acquisition of each transmission axis.

The various embodiments described herein have been provided as examples only. It should be understood that various modifications in form and detail can be made to the embodiments described and illustrated herein.

The invention claimed is:

1. A method for determining a radiation dose, comprising:
   receiving at least one polarized signal from a radio-luminescent element;
   determining a degree of linear polarization and an angle of linear polarization of the at least one polarized signal based on at least one predetermined polarization transmission axis; and
   determining the radiation dose based on the degree of linear polarization and the angle of linear polarization of the at least one polarized signal.

2. The method of claim 1, further comprising determining the radiation dose based on the degree of linear polarization and the angle of linear polarization of the at least one polarized signal and a predefined correction factor.

3. The method of claim 1, further comprising capturing the at least one polarized signal with a polarization sensitive sensor.

4. The method of claim 1, wherein the radio-luminescent element is inherently polarized.

5. The method of claim 1, wherein the radio-luminescent element comprises Cerenkov radiation.

6. The method of claim 1, further comprising:
   determining a directionality of the Cerenkov radiation based at least on the degree of linear polarization and the angle of linear polarization of the Cerenkov radiation.

7. The method of claim 1, further comprising:
   correcting the directionality of the Cerenkov radiation based on the polarized acquired signal and the predefined correction factor describing directionality of Cerenkov light.

8. The method of claim 1, wherein the degree of linear polarization and angle of linear polarization of the radio-luminescent element are spatially determined.

9. The method of claim 1, wherein the radio-luminescent element is a scintillation element.

10. The method of claim 1, wherein the angle of polarization of a radio-luminescent element is determined by a polarizing element.

11. The method of claim 1, wherein the polarization sensitive sensor captures the at least one polarized signal using two sets of orthogonal polarization transmission axis.

12. The method of claim 1, wherein the degree of linear polarization and the angle of linear polarization of the at least one polarized signal are determined based on the following:

$$DoLP = I_{pol}/(I_{pol} + I_{rand.pol.})$$

$$AoLP = \alpha$$

wherein:
   DoLP refers to the degree of linear polarization;
   AoLP is the angle of linear polarization;
   $I_{pol}$ refers a polarized contribution of the signal;
   $I_{rand.pol.}$ refers to a randomly polarized portion of the signal; and
   $\alpha$ refers to a mean angle of polarization.

13. The method of claim 1, wherein the degree of linear polarization and the angle of linear polarization of the at least one polarized signal are determined using:

$$I = I_{pol}\cos^2(\alpha_0 - \alpha) + \cdot I_{rand.pol.}$$

wherein:
   I refers to the total signal acquired from one transmission axis;
   $I_{pol}$ refers to the polarized portion of the signal;
   $I_{rand.pol}$ refers to the randomly polarized portion of the signal;
   $\alpha_0$ refers to the transmission axis;
   $\alpha_\square$ refers to the angle of linear polarization;
   $(I_{pol})/(I_{pol}+I_{rand.pol.})$ refers to the degree of linear polarization.

14. The method of claim 1, wherein the degree of linear polarization and the angle of linear polarization of the at least one signal are determined using Stokes parameters such that:

$$\vec{S} = \begin{pmatrix} S_0 \\ S_1 \\ S_2 \\ S_3 \end{pmatrix} = \begin{pmatrix} I_0 + I_{90} \\ I_0 - I_{90} \\ I_{45} - I_{135} \\ 1 - (S_1^2 + S_2^2) \end{pmatrix}$$

$$AoLP = \arctan(S_2/S_1)$$

$$DoLP = \sqrt{S_1^2 + S_2^2}/S_0$$

wherein:
   DoLP is the degree of linear polarization;
   AoLP is the angle of linear polarization;
   $I_0$ refers to signal acquired from a polarization transmission angle of 0°;
   $I_{45}$ refers to signal acquired from a polarization transmission angle of 45°;
   $I_{90}$ refers to signal acquired from a polarization transmission angle of 90°; and
   $I_{135}$ refers to signal acquired from a polarization transmission angle of 145°.

15. A system for determining a radiation dose, comprising:
- a polarization sensitive sensor for capturing at least one polarized signal from a radio-luminescent element; and
- a processor configured to:
  - receive the at least one polarized signal; and
  - determine a degree of linear polarization and an angle of linear polarization of the at least one polarized signal based on at least one predetermined polarization transmission axis.

16. The system of claim 15, wherein the processor is further configured to determine the radiation dose based on the degree of linear polarization and the angle of linear polarization of the at least one signal and a predefined correction factor.

17. The system of claim 15, wherein the radio-luminescent element comprises Cerenkov radiation.

18. The system of claim 15, wherein the processor is further configured to determine a directionality of the Cerenkov radiation based at least on the degree of linear polarization and the angle of linear polarization of the Cerenkov radiation.

19. The system of claim 15, wherein the processor is further configured to determine a directionality of the Cerenkov radiation based at least on the degree of linear polarization and the angle of linear polarization of the Cerenkov radiation.

20. The system of claim 15, wherein the degree of linear polarization of the radio-luminescent element is spatially determined.

* * * * *